Figure 2:
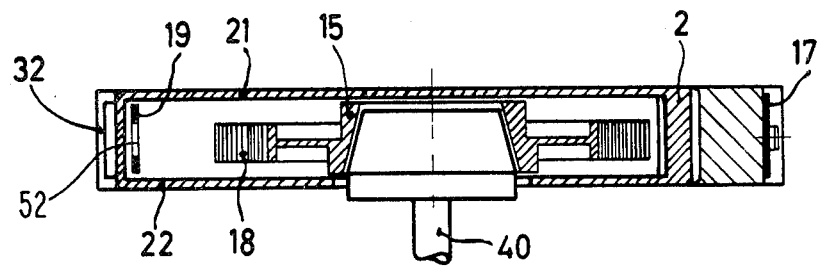

United States Patent [19]

Schoettle et al.

[11] 4,201,356

[45] May 6, 1980

[54] CARTRIDGE ARRANGEMENT COMPRISING AN ADAPTER

[75] Inventors: Klaus Schoettle, Heidelberg; Karl Uhl, Frankenthal; Heinrich Wittkamp, Mannheim; Peter Dobler, Ludwigshafen; Helmut Lewin, Bobenheim-Roxheim, all of Fed. Rep. of Germany

[73] Assignee: BASF Aktiengesellschaft, Ludwigshafen, Fed. Rep. of Germany

[21] Appl. No.: 888,784

[22] Filed: Mar. 21, 1978

[30] Foreign Application Priority Data

Mar. 23, 1977 [DE] Fed. Rep. of Germany ....... 2712622

[51] Int. Cl.$^2$ ............................................. G11B 23/08
[52] U.S. Cl. ..................................... 242/197; 360/132
[58] Field of Search ........................ 242/192, 197–200; 360/96, 132

[56] References Cited

U.S. PATENT DOCUMENTS

| 3,980,253 | 9/1976 | Burdorf et al. | 242/192 |
| 4,014,042 | 3/1977 | Schoettle et al. | 360/132 |
| 4,023,748 | 5/1977 | Burdorf et al. | 242/192 |
| 4,056,245 | 11/1977 | Schoettle et al. | 242/197 |

*Primary Examiner*—Leonard D. Christian
*Attorney, Agent, or Firm*—Keil & Witherspoon

[57] ABSTRACT

The cartridge arrangement of the present invention enables recording and/or playback apparatus to be used with cartridges of various sizes, the cartridges being provided with releasable locking means and, after the release of such means, being able to be opened to permit the tape roll(s) to be rotated on the recording and/or playback apparatus.

The cartridge arrangement is applicable to every type of recording medium in tape or strip form in systems employing cartridges in which there is a need for using cartridges of various sizes, especially in the case of the recording and playback of magnetic signals.

8 Claims, 3 Drawing Figures

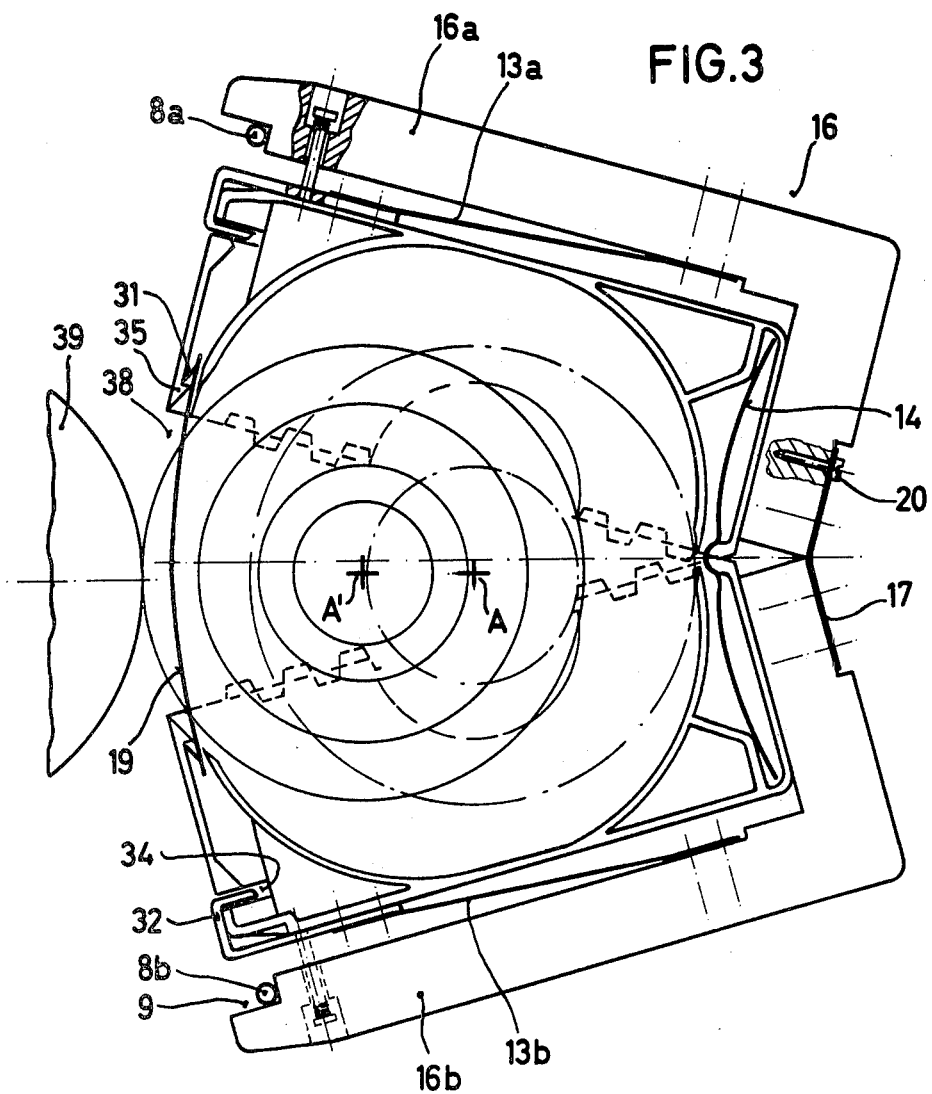

CARTRIDGE ARRANGEMENT COMPRISING AN ADAPTER

The present invention relates to a cartridge arrangement which consists of a small cartridge containing at least one pack of a recording medium in tape or strip form and suitable for use on a recording and/or playback apparatus (hereinafter referred to as "recorder") instead of a large cartridge containing a similar recording medium, the large cartridge having a large locking member co-operating with recorder-associated releasing means for opening/closing the large cartridge, and of a frame supplementing the shape of the small cartridge, so that the whole corresponds in size to the large cartridge.

Cartridge adapters are already known. These are usually supplementary devices which, when provided with a small cartridge, correspond in size to a larger cartridge of the same type and are thus able to be used on apparatus devised for the larger cartridges. In the following description, these larger cartridges will be referred to as "large cartridges".

Such a small cartridge/large cartridge combination is advantageous, for example, in the case of a video recording/playback cartridge system which can also be used for shooting by means of a suitable video camera employing small cartridges.

In German Published Application (DAS) 23 64 397, for example, a large cartridge and an apparatus for video recording/playback purposes have been disclosed, the cartridge consisting of two pivotally connected parts of equal size for accommodating a roll of tape on a flangeless reel. To operate this large cartridge, the apparatus is provided with releasing and pivoting elements for unlocking and swinging the cartridge parts apart, and with means for moving the roll of tape up against a tape drive member. For such a cartridge-recorder/playback apparatus combination, an adapter permitting the operation of a small cartridge on the said apparatus is not known, nor was such an adapter obvious to the skilled artisan.

German patent application (DAS) 2364397 has its correspondency in U.S. Pat. No. 3,987,489, issued Oct. 19, 1976, and reissued on Apr. 24, 1979, as Re. 29,976.

An object of the present invention is therefore to provide a cartridge arrangement of the type referred to above, for a cartridge provided with locking means.

According to the present invention, this object is achieved by a cartridge arrangement consisting of a small cartridge for use instead of a large cartridge on a recorder, the large cartridge being provided with a large locking member co-operating with recorder-associated releasing means for opening/closing the large cartridge, and of a frame supplementing the shape of the small cartridge, wherein there are provided a small locking member in the small cartridge corresponding to the large locking member, and releasing means on the frame having the same function as the recorder-associated releasing means, the frame also being provided with retaining means for the small cartridge which facilitate opening and closing of the small cartridge.

The cartridge arrangement of the invention enables large cartridges to be easily replaced by small ones without there being any need for costly supplementary devices. As will be apparent from the following description and claims, an adapter (hereinafter referred to as "frame") which is easy to manufacture and is reliable in operation can be used. Advantageously, this frame has retaining springs for the small cartridge, it thus being possible to create an opening by deflecting these springs and, moreover, to exert an additional closing force upon the cartridge parts.

In advantageous embodiments of the invention, the frame consists of two L-shaped portions hingedly connected to one another, and the retaining springs are provided with releasing members. This enables the retaining springs to serve two purposes, i.e. to hold and to unlock/lock the small cartridge.

In the case of the cartridge-recorder/playback apparatus combination according to German Published Application (DAS) 23 64 397, the large cartridge consists of two parts of approximately the same size which are connected to one another by locking and hinge means. In the present invention the small cartridge is of similar design and the frame portions are connected to one another by a hinge, and the retaining springs on both frame portions engage the cartridge symmetrically with respect to the plane of separation of the cartridge.

This constitutes a special adapter design for cartridges which are opened by pivotally swinging the cartridge parts apart.

A hinge, formed by a spring, between the frame portions, which can be produced very economically and is very reliable in operation, is very advantageous in this design.

In another embodiment of the invention, the locking means consist of a frontal spring and projections on the cartridge housing which co-operate therewith, hooks being provided on the retaining springs for detaching the ends of the frontal spring from the projections on the housing. This ensures that the small cartridge within the frame is in a state of operational readiness, in which state the hooks detach the frontal spring, and opening as well as closing of the cartridge can be affected.

In an advantageous embodiment of the cartridge arrangement, the space inside the small cartridge is of oval shape, when viewed in plan, the circular arcs of the oval corresponding to the periphery of the full tape pack.

Figure 1:
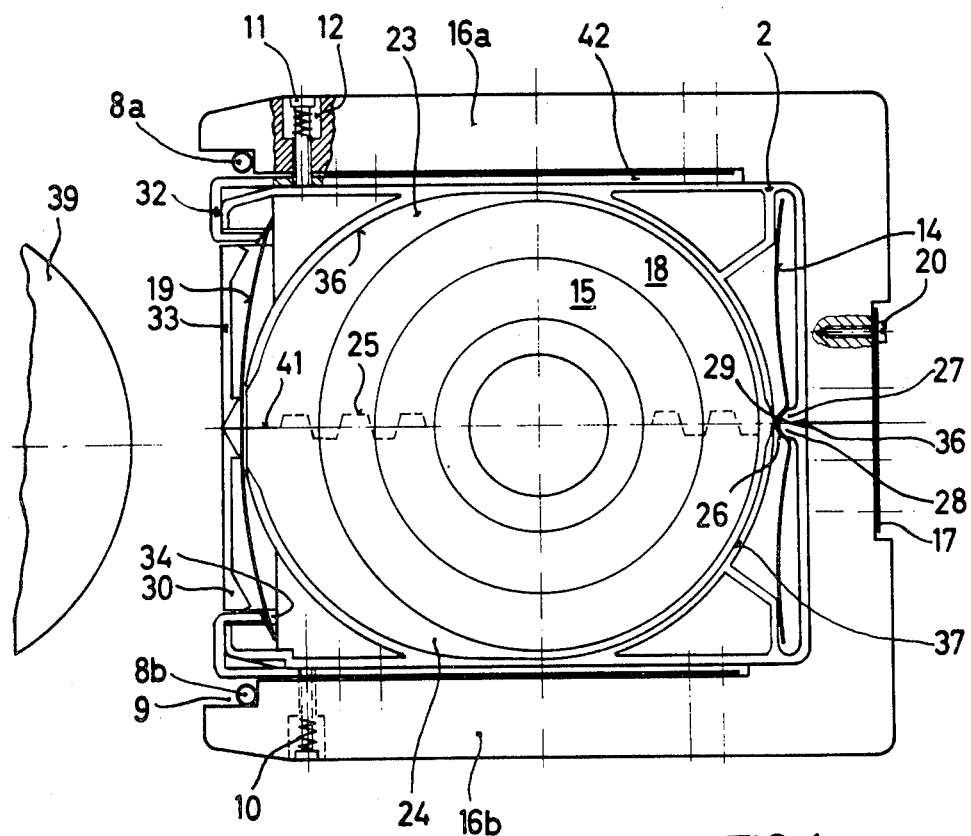

Further details of the invention are disclosed in the following description of one embodiment of the cassette arrangement illustrated in the accompanying drawings, in which FIG. 1 is a plan view which shows a small cartridge with adapter in the closed condition;

FIG. 2 is a sectional view of the arrangement of FIG. 1, taken along the plane of separation of the cartridge; and FIG. 3 is a plan view which shows the small cartridge with adapter in the open condition.

The small cartridge 2 as well as the large cartridge, which is not shown here, are single-reel cartridges. The magnetic tape is wound on a hub 15, which is preferably made of aluminum, to form roll 18. At its periphery, the roll 18 is provided with a leader tape for threading purposes which holds itself to the edges of the outer turns of tape by means of lateral teeth, so that the roll 18 is held together and the outer turns of tape cannot slip off the roll. When the cartridge 2 is closed (cf. FIG. 1) the hub 15 is held between upper and lower walls 21 and 22 of the cartridge 2 by means of ribs (not shown) in such a way that it is prevented from rotating and being displaced vertically and radially when the cartridge is handled. An additional feature for preventing rotation of the roll 18 may consist of toothed elements (not shown) on the lower side of the hub 15 which engage matching recesses in or projections (not shown) on the lower wall 22 of the cartridge. The cartridge 2 is composed of two unilaterally open hollow substantially right parallelepipedic boxes of the same size constituting cartridge parts 23, 24 which are pivotally connected to one another by connecting means still to be described in greater detail. In an advantageous embodiment of the invention, the cartridge parts 23 and 24 each consist of two simple injection moldings made of plastics material, connected to one another in a suitable manner, for example by ultrasonic welding or by screws. The cartridge parts 23 and 24 completely enclose the tape roll 18 when the cartridge 2 is closed, so that there is no direct access to the tape from the outside at any point. The tape roll 18 is thus afforded optimum protection against mechanical damage and dust. Where the two cartridge parts 23 and 24 meet, portions of the lower and upper surfaces 22 and 21 over- and underlap, forming interlocking teeth 25 which bring about an increase in the mechanical strength of the cartridge 2 in the plane of separation 41, to make the cartridge virtually dust-tight and improve protection of the tape and the tape pack 18 against mechanical damage. Other interlocking arrangements may also be used, for example a tongue-and-groove connection. An additional safeguard against bending of the cartridge 2 in the plane of separation consists of a first and a second spring. The first spring 14 acts as the closing spring. Advantageously, it is a leaf spring, and its ends may be held in a suitable position in the two cartridge parts 23 and 24. The arrangement and shape of the spring 14 in the drawing make it clear that a force which causes the teeth 25 to firmly interlock is exerted on the cartridge parts 23 and 24. In the illustrated embodiment of the spring 14, an omega-shaped central portion 26 embraces the projections 27 and 28 on the housing which together have a substantially semicircular outline, the pivoting point 29 of the cartridge parts 23, 24 substantially coinciding with the center of the circle. The projections 27, 28 point inwardly, that is, to the left in FIGS. 1 and 3. To simplify manufacture, both cartridge parts 23 and 24 are preferably of symmetrical and identical shape. In the closed position of the cartridge 2, the projections 27, 28 form an angular gap 36 which is symmetrical to the plane of separation 41 and extends outwardly from the pivoting point 29, the angle of this gap determining the desired opening angle, e.g. 30°. The cartridge can thus be opened without the omega-shaped central portion 26 of the spring 14 being elongated. The spring cannot move toward the middle of the cartridge beyond a certain point, owing to the inside cylindrical wall which delimits the space for the pack; only part 37 of this wall is shown in the drawings. The play with which the omega-shaped central portion 26 embraces the projections 27 and 28 on the cartridge parts 23 and 24, and the resilience of the said central portion compensate for tolerances in the pivoting points of the cartridge 2 and the loading mechanism which is not shown here but is described in the aforementioned German Published Application. The width of the spring is only slightly less than the inside height of the housing. Due to the very small amount of play and to the length of the spring arms, the cartridge parts 23, 24 are held in the same horizontal plane. By means of its arms, the spring 14 produces a closing torque in the two lateral regions of the cartridge 2, which torque manifests itself as the closing force at the teeth 25.

The second spring 19 will be referred to hereinafter as the "frontal spring"; it may be provided with a rectangular opening for example. When the cartridge 2 is in the closed position, the frontal spring 19 engages the wedge-shaped projections 30, the latter cooperating with an aperture 52 in the frontal spring near its projections 31. The steeply inclined sides of the projections 30, which extend from the side walls 33 of the cartridge, constitute a simple means of compensating for slight differences in length of the frontal spring 19 and/or housing tolerances which occur during manufacture. The rectangular opening 52 in the frontal spring 19 is so dimensioned that at least part of the tape roll 18 can pass therethrough without the turns of the tape pack or the leader tape being touched. The frontal spring 19 in the relaxed state is slightly bowed, so that it bears against the inside of the front wall 17 after it has been fitted in the cartridge, a further retaining force being therefore applied to the teeth 25 when the cartridge 2 is in the closed position. In order to open the cartridge 2, recorder-associated hooks 32 pass through the apertures or slots 34 in the front wall of the cartridge opposite the ends of the frontal spring 19, so that the said ends are bent back, thus lifting the projections 31 clear of the projections 30. If the cartridge parts 23 and 24 are now swung apart as described, smaller projections 35 engage the barb-like projections 31 of the spring 19, thus limiting the opening angle. The wedge shape of the projections 30 enables the curved ends of the frontal spring 19 to readily slide up and over the projections when the cartridge is closed.

The spring 19, as can be seen from FIGS. 1 and 2, and the spring 14 are confined so narrowly over their entire length inside the cartridge 2 that even slight bending or warping of the cartridge in the plane of separation 41 of the cartridge parts 23 and 24 causes the springs 14 and 19 to bear against the inner surfaces of the lower and upper cartridge walls, providing sufficiently strong resistance which opposes any further bending or warping.

The spring 19 may also be designed in any other suitable manner, for example it may be in the form of a rectangular loop of wire. It is not absolutely necessary to provide an aperture in the frontal spring 19: an elongated, substantially U-shaped spring member would also be sufficient. The frontal spring 19 can be readily inserted subsequently in the otherwise complete cartridge 2, the housing parts of which have for example already been screwed together. Using special tools, it is also possible to remove the frontal spring 19, for example, in order to replace it, to exchange the tape roll 18 or to repair the cartridge.

A comparison of the positions of the tape roll 18 in FIGS. 1 and 3 shows that the roll 18 in the latter drawings has already emerged from the aperture 38 and has reached a position in which it makes contact with the peripheral surface of a recorder-associated drive member 39, shown only in part, which drives two tape packs in a recorder operating on the contact-winding principle. In recorders of this type, in order to maintain adequate compressive forces between the drive member—which will be referred to hereinafter as the "capstan"—and the tape packs, it is necessary for the packs to advance and retreat relative to the capstan during feeding of the tape to take the decreasing and increasing pack diameters into account. In a recorder of this type, the shafts carrying the tape packs are advantageously so mounted that they can be radially displaced via springs toward and away from the capstan.

The shaft 40 which carries the hub 15 is mounted in the described manner so as to be displaceable essentially along the central axis 41 of the cartridge toward the capstan 39. The hub 15 is thus displaced within the sector between the cartridge parts 23 and 24 via the shaft 40. The pack 18 is a full tape pack from which the leading end of a leader tape is peeled by means of a peeling blade (not shown in the drawings hereof). The leader tape is then guided around the capstan 39 by guide means, not shown here, and fastens itself to a second hub to commence the formation of a take-up roll (not shown), the tape being scanned by scanning means (not shown) as it is fed from the supply roll to the take-up roll. The leader tape is made of a plastics film which is usually thicker than the magnetic tape itself and is spliced to the latter by known means. The cartridge design ensures that the leader tape inside the cartridge 2 cannot detach itself from the pack particularly if springs, not shown here, are employed which hold the turns of the pack together. The distance between the periphery of the roll of tape and the inside wall of the cartridge is advantageously such that the leader tape remains in contact with the periphery of the pack. Similarly, the other spaces between the pack and cartridge parts are so dimensioned that the leader tape cannot jam in the cartridge or detach itself from the pack when the pack is inadvertently turned in the opposite direction, even if the end of the leader tape is standing slightly away from the periphery of the pack.

Inadvertent detachment of the leader tape from the pack prior to threading on the recorder would give rise to disturbances in predominantly automatic threading operations. After the magnetic tape has been completely unwound, the empty hub 15 bears against the periphery of the capstan. Rewinding of the magnetic tape from the take-up roll onto hub 15 of the cartridge 2 can then be effected until the maximum pack diameter has been achieved.

The above-described small cartridge 2 largely corresponds to the large cartridge, i.e. the standard cartridge, with regard to its design and function. The small cartridge 2 may be used, for example, in a small portable recorder, e.g. a video camera, and, if it is desired to transfer or playback the video signals, can be played back on a large recorder. In the present case the small cartridge differs from the large or standard cartridge—apart from its smaller size—with respect to the shape of the interior space for the tape pack 18, this shape being preferably oval, when viewed in plan, and the circular arcs of the oval 36 corresponding essentially to the periphery of the full tape pack 18.

The methods of signal recording, the type of magnetic tape and the hubs are identical in both cartridges.

As can be seen from FIG. 1, the small cartridge 2 is arranged in a frame 16, the latter consisting of L-shaped portions 16a and 16b which are hingedly connected to one another. The frame portions 16a and 16b are connected to one another at the short legs of the L's, for example, by means of a leaf spring 17 fastened with screws 20. Other types of hinge connection are also feasible, but disadvantageous with respect to the pivoting point 29 of the arrangement. Another advantage of using the leaf spring 17 is that an increase in the rigidity of the arrangement is achieved, thus improving the resistance of cartridge 2, located in the frame 16, to bending.

Retaining springs 13a and 13b, preferably leaf springs, are attached to the inner surfaces of the long legs of frame portions 16a and 16b. These springs 13a and 13b in conjunction with the hooks 52 mentioned earlier serve to hold the cartridge 2 and to release the frontal spring 29 of cartridge 2. The springs 13a and 13b are arranged in gaps 42 (FIG. 1) between the inner surfaces of the long legs of frame portions 16a and 16b and the cartridge 2, and are fastened at one end near the short legs and, at the other, connected to hooks 52 which are provided with pins 11 guided in bores 12 in the frame portions 16a and 16b. When the cartridge 2 is inserted in the frame 16, either inside or outside the recorder, any displacement of the cartridge 2 relative to the frame 16 is counteracted irrespective of whether the frame and the cartridge are in the open or the closed condition. The bores 12 are enlarged on the outside to receive compression springs 10 arranged coaxially around the pins 11, which springs serve as return springs for the retaining springs 13a and 13b and the pins 11. When the cartridge 2 is inserted in the frame 16, the hooks 32 enter the slots 34 in the cartridge 2 and deflect the ends of the frontal spring 19 for the purpose of unlocking the cartridge parts 23 and 24, so that the cartridge 2 is ready to be opened, regardless of whether the frame 16 is part of the recorder or is detachable therefrom to facilitate insertion of the cartridge 2. The free ends of the long legs of frame portions 16a and 16b have recesses 9 or apertures which the recorder-associated pivoting members 8b and 8b enter from below as soon as the cartridge arrangement has been placed on the recorder. Depending on the distance between the pivoting members on the recorder, the recesses may also be provided in the small cartridge 2.

FIG. 3 shows the pivoting members 8a and 8b in the position in which they have opened the cartridge. The recorder-associated pivoting device required to effect opening is not described here in further detail. As can be seen from FIG. 3, the frame portions 16a and 16b are swung apart together with the cartridge parts 23 and 24, thus producing the opening 38. The pivoting axis of the frame portions 16a and 16b is preferably aligned with the pivoting axis of the pivoting device to permit stress-free opening of the cartridge 2.

The L-shaped frame portions 16a and 16b consist of suitable material, advantageously plastics or metal which can be processed by pressing, casting or injection molding in mass production.

As FIGS. 1 and 3 show, the space provided for the tape pack 18 inside the cartridge 2 is of oval shape in plan, unlike the circular shape of the interior space of the large cartridge according to German Published Application (DAS) 23 64 397, but it can of course be of any other suitable elongated shape. Due to the smaller maximum diameter of the tape pack 18 of cartridge 2, the travel of the pack from its position inside the closed cartridge (center A) to its operating position (center A') is longer than the travel of the larger tape pack of the large cartridge. The cartridge 2 is therefore preferably larger in the longitudinal direction than in the transverse direction.

The deviations of centers A and A' from the plane of separation 41 of cartridge 2 are attributable to the fact that the shaft 40 moves on a pivoting arm, i.e. describes a circular arc, as the tape pack 18 is moved up against the periphery of the capstan 39.

Like the large cartridge of German Published Application (DAS) 23 64 397, which has been given as an example, the above-described small cartridge 2 has the shape of a rectangular paralleliped. The cartridge may in principle have any other suitable shape because the frame can be adapted to receive a large variety of cartridge shapes through the use of the retaining springs. Due to the employment of a spring, which also serves as hinge, to connect the frame portions, the above-described adapter is preferably used in conjunction with cartridges whose parts are swung apart on a pivot, but is can be modified by the skilled artisan for cartridges which are opened in a different manner.

We claim:

1. A cartridge arrangement for permitting a relatively small cartridge containing at least one pack of tape-like recording medium to be used on a recording and/or playback apparatus designed for use with a relatively large cartridge, each said cartridge comprising two sections, hinge means pivotally connecting said sections together, and an automatically releasable locking member, and said apparatus having pivoting means for causing said sections to be spread apart, said arrangement comprising: an adapter frame dimensioned on the inside to receive said relatively small cartridge, having outside dimensions generally corresponding to those of the relatively large cartridge, and being provided with means for retaining said small cartridge as well as means carried by said retaining means and cooperating with the relatively short locking member of said small cartridge for releasing said cartridge upon insertion of said cartridge into said frame.

2. A cartridge arrangement as claimed in claim 1, wherein said retaining means is in the form of a pair of retaining springs carrying said releasing means at their free ends.

3. A cartridge arrangement as claimed in claim 1 or 2, wherein said frame comprises two L-shaped portions and hinge elements for pivotally connecting said portions together.

4. A cartridge arrangement as claimed in claim 3, wherein said releasing means are shaped to cooperate in the opening of said small cartridge as said L-shaped portions are spread apart by said pivoting means.

5. A cartridge arrangement as claimed in claim 3, wherein said two sections pivotally connected by said hinge means are half sections and wherein said releasing means engage said cartridge symmetrically with respect to the plane of separation of the cartridge.

6. A cartridge arrangement as claimed in claim 4, wherein said locking member is in the form of a frontal spring cooperating with projections on said two cartridge sections and wherein said releasing means are shaped to cooperate with said frontal spring to release said spring from said projections.

7. A cartridge arrangement as claimed in claim 1, wherein the inside of said small cartridge is formed to provide a space of elongated shaped for the pack of said recording medium.

8. A cartridge arrangement as claimed in claim 7, wherein said space is of oval shape.

* * * * *